United States Patent [19]

Futami et al.

[11] Patent Number: 5,363,004

[45] Date of Patent: Nov. 8, 1994

[54] ROTATOR ELEMENT FOR ELECTRIC MOTOR

[75] Inventors: Toshihiko Futami, Ashigara; Yoshiharu Shida, Fuji, both of Japan

[73] Assignee: Kabushiki Kaisha Toshiba, Kawasaki, Japan

[21] Appl. No.: 13,361

[22] Filed: Feb. 4, 1993

[30] Foreign Application Priority Data

Apr. 1, 1992 [JP] Japan .................. 4-078117

[51] Int. Cl.$^5$ .......................... H02K 21/12
[52] U.S. Cl. ...................... 310/156; 310/42; 310/89; 310/216; 310/261
[58] Field of Search ............ 310/42, 156, 216, 261, 310/262, 264, 265, 89

[56] References Cited

U.S. PATENT DOCUMENTS

| | | | |
|---|---|---|---|
| 4,625,392 | 12/1986 | Stokes | 310/156 |
| 4,683,393 | 7/1987 | Stokes | 310/156 |
| 4,746,827 | 5/1988 | Ochai | 310/156 |
| 5,040,286 | 8/1991 | Stark | 310/42 |
| 5,140,210 | 8/1992 | Shirakawa | 310/156 |
| 5,175,461 | 12/1992 | Zigler | 310/156 |
| 5,258,678 | 11/1993 | Futami | 310/156 |

FOREIGN PATENT DOCUMENTS 60-109749  6/1985  Japan .

*Primary Examiner*—Robert Skudy
*Attorney, Agent, or Firm*—Cushman, Darby & Cushman

[57] ABSTRACT

A rotator element for an electric motor is formed with a cylindrical core body which is to be rotated by a rotary filed produced by a winding of the electric mortor and a plurality of magnets. The core body is substantially made of stacked disc-shaped plates, each of which has cutout portions arranged on the circumference areas so that the cylindrical core body is provided with holes when the disc-shaped plates are stacked. The magnets are inserted in the holes. For smooth insertion in the hole, each of magnets has a cutaway portion. The cutaway portion is projected or extended from the hole. A ring body is placed on the outermost side of stacked disc plates so that the outer surface of said ring body is substantially conform to the surface of said core body and the inner surface of said ring body is opposed to said cutaway portions of the magnets.

7 Claims, 8 Drawing Sheets

ROTATOR ELEMENT FOR ELECTRIC MOTOR

BACKGROUND OF THE INVENTION

1. Field of the Invention

The present invention relates to a rotator element for an electric motor. More particularly, the present invention relates to an improved rotator element having permanent magnets.

2. Description of the Related Art

A conventional rotator element for an electric motor is shown in FIG. 1, which is similar to the permanent magnet: type of the rotator element disclosed in the Japanese Patent Disclosure 60-109749. As shown in FIG. 1, rotator element 2 has a cylindrical core body 4 made of stacked iron disc-shaped plates 8 and a plurality of permanent magnets 6 secured to cylindrical core body 4. Each of the disc-shaped plates 8 has cutout portions on its circumferential area. The cutout portions make holes for inserting magnets 6 when disc-shaped plates 8 are stacked. Permanent magnets 6 with opposite poles are alternately inserted in the holes. Disc-shaped plates 8 are firmly fastened between lid plates 30 with rivets 32.

In order to perform the smooth insertion of magnets to core body 4, each of magnets is provided with a cutaway portion 26 at their ends adjacent the lid plates 30 as disclosed in FIGS. 2, 3a and 3b. Cutaway portion 26 provides a clearance between the magnet 6 and the disc-shaped plates 8 which contain them. The clearance serves for the smooth insertion of magnets 6 into the holes without deforming or cracking the magnets 6, however it causes a disadvantage. As illustrated in FIG. 2, a cylindrical surface of core body 4 is shaped with a cutting tool 40 such as a bite for developing a uniform air gap of the motor, which would realize a suitable magnetic field in the air gap. When cutting force is applied to stacked disc-shaped plates 8 in the area of cutaway portions 26, disc-shaped plates in areas L1 and L2 are displaced or moved as shown in FIG. 3a or FIG. 3b. Such displacement causes the deformation of disc-shaped plates 8 and the dimensional inaccuracy of core body 4.

SUMMARY OF THE INVENTION

Accordingly, it is an object of the present invention to provide an improved rotator element for an electric motor, which ovecomes the disadvantage mentioned above.

In accordance with the present invention, a rotator element for an electric motor comprises a cylindrical core body formed with first stacked disc-shaped plates, each of said first plates having a plurality of cutout portions arranged on the circumferential area thereof so as to provided a plurality of holes along a rotational axis of said core body when said plates are stacked;

a plurality of permanent magnets fixed to said core body, each of said magnet having a cutaway portion provided on at least one end thereof, wherein said cutaway portion is projected from said hole; and a ring body placed on at least one end of said core body so that the outer surface of said ring body is substantially conform to the surface of said core body, wherein the inner surface of said ring body is opposed to said cutaway portions.

BRIEF DESCRIPTION OF THE DRAWINGS

The accompanying drawings illustrate a preferred embodiment of the present invention.

DETAILED DESCRIPTION OF THE PREFERRED EMBODIMENT

Figure 2:
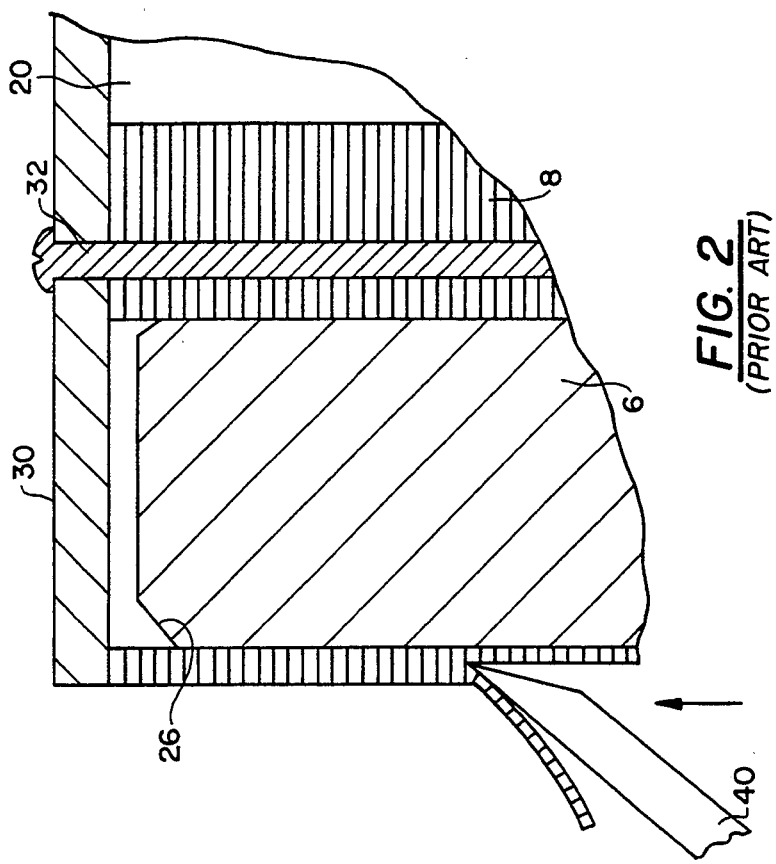
FIG. 2 is a partial cross sectional view of a core body of the conventional rotator element shown in FIG. 1, which illustrates a shaping step of the core body.
Figure 1:
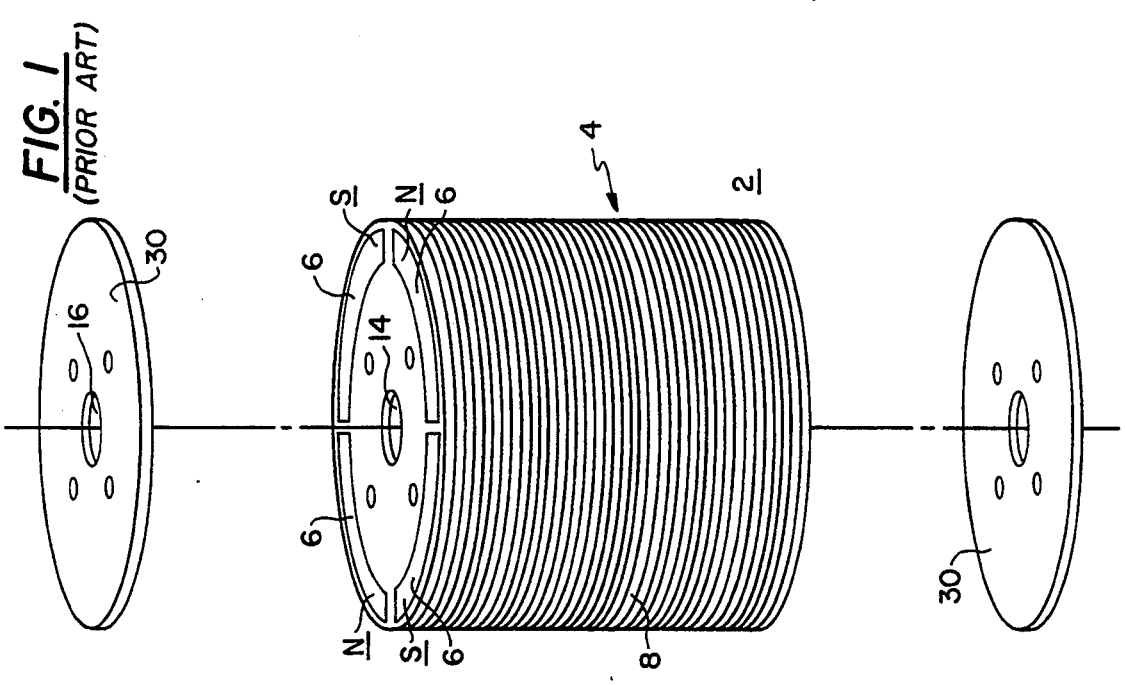
FIG. 1 is an exploded view of a conventional rotator element for an electric motor.
Figure 3A:
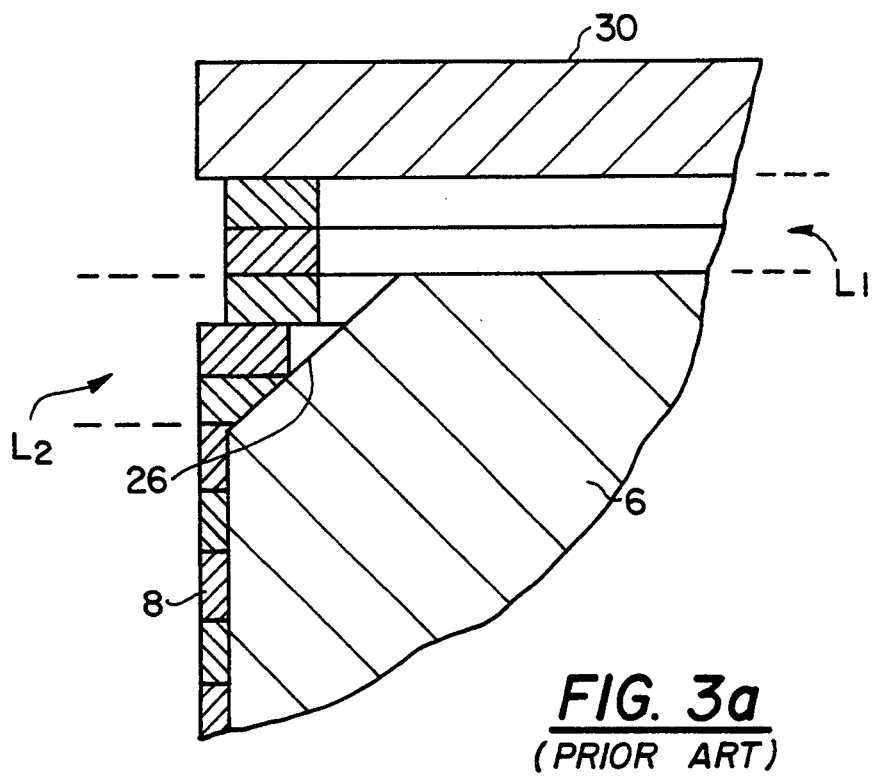
FIGS. 3a and 3b are partly sectional fragmentary schematic views of the core body exaggeratly illustrating unsatisfied shaping results.
Figure 3B:
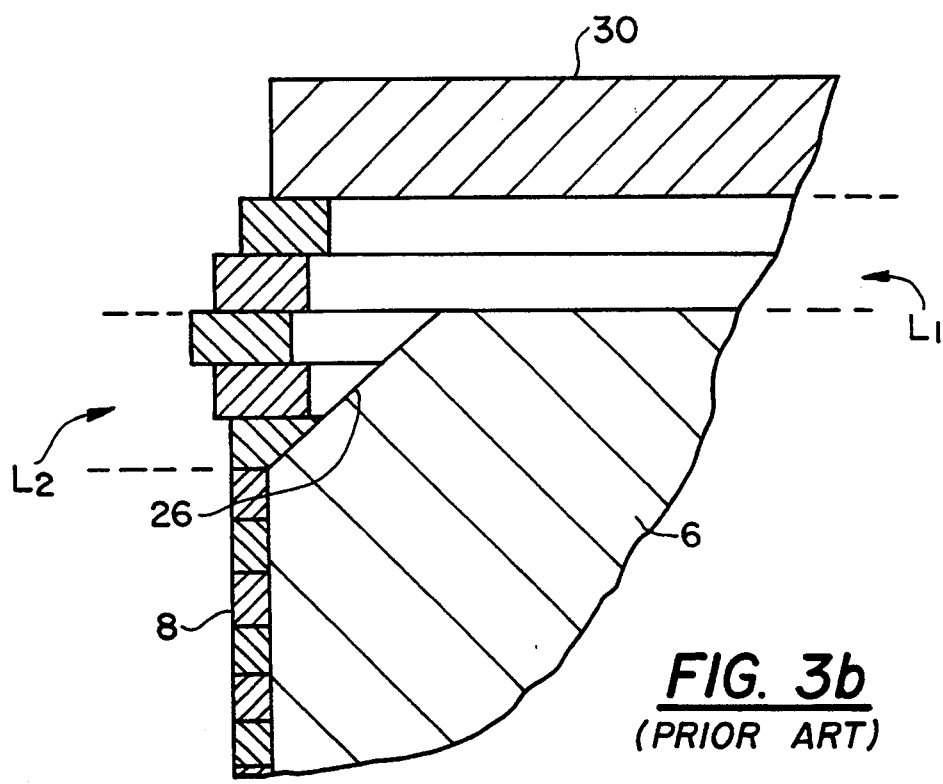
Figure 4:
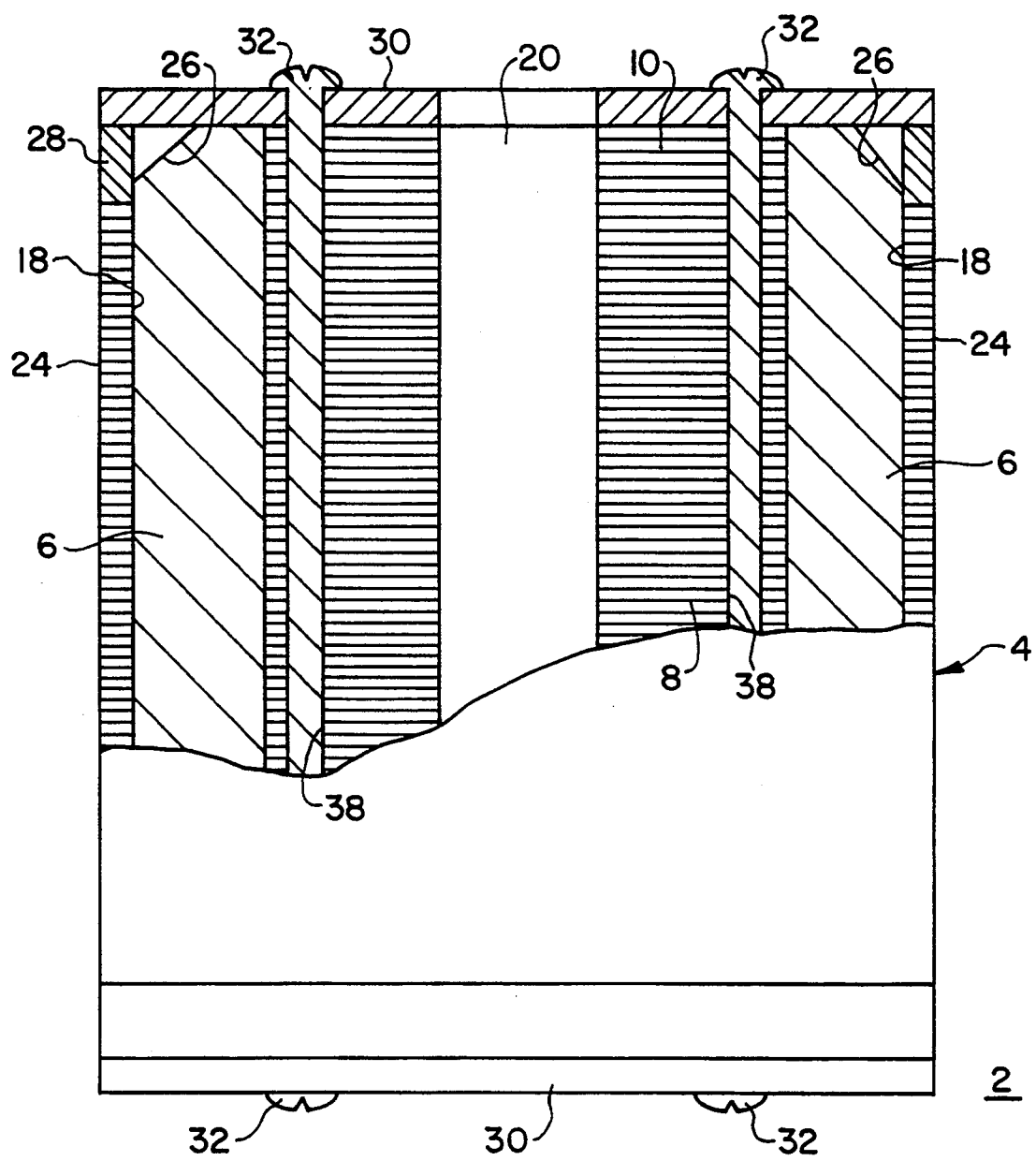
FIG. 4 is a partial cross sectional view of a first embodiment of a rotator element for an electric motor of the present invention.
Figure 5B:
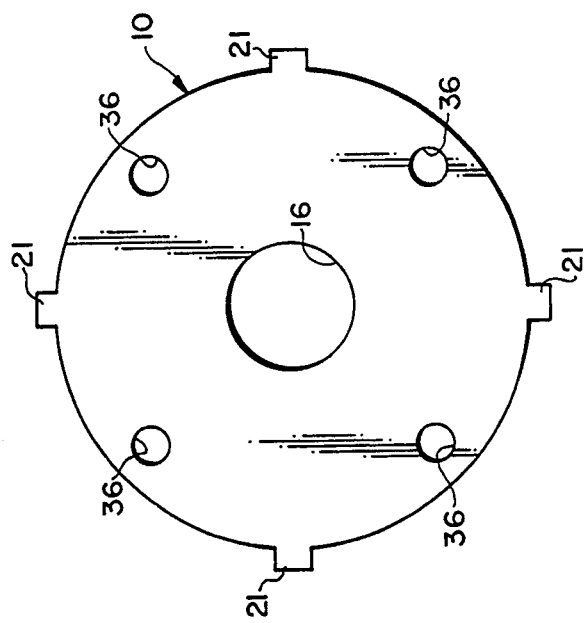
FIGS. 5a and 5b are front views of disc-shaped plates of the rotator element shown in FIG. 4.
Figure 5C:
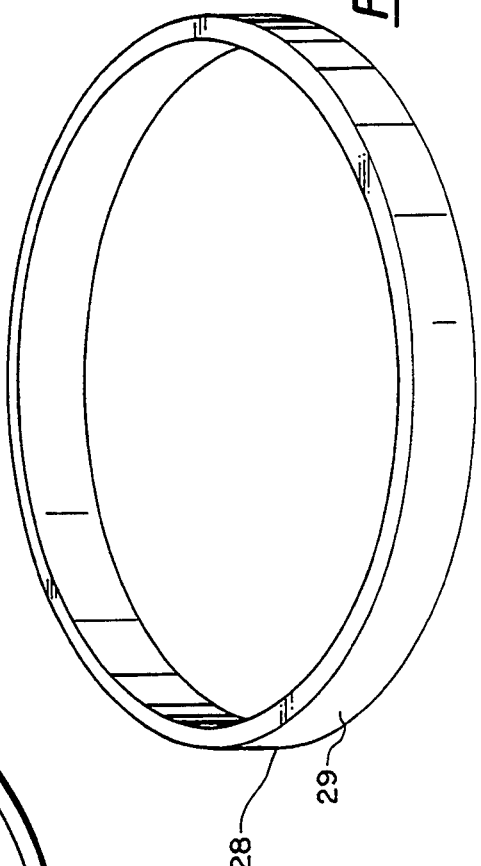
FIG. 5c is a perspective view of a ring body of the rotator element shown in FIG. 4.
Figure 5A:
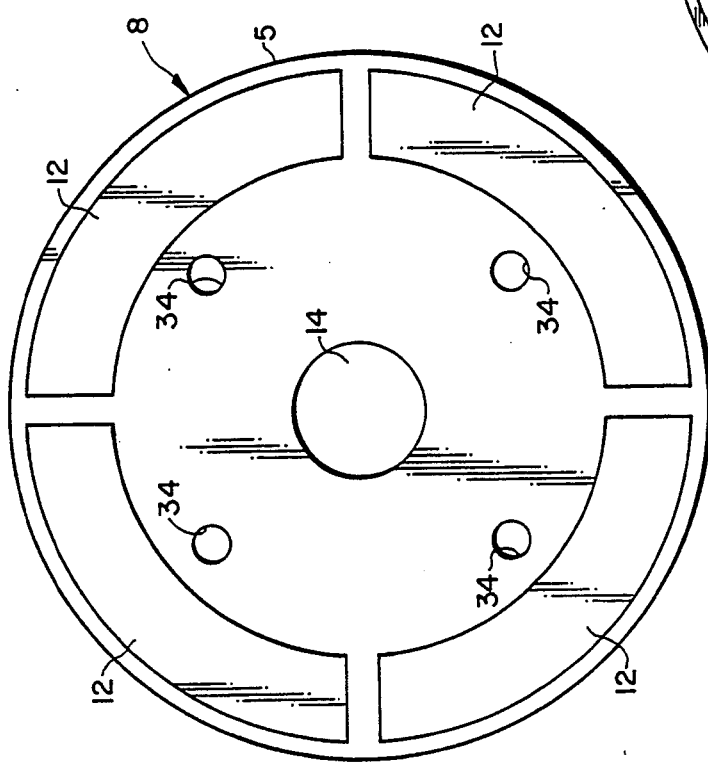

FIG. 4 is a cut-away view of a rotator element 2 of an electric motor according to the present invention. Rotator element 2 is assembled with a cylindrical core body 4 and four permanent magnets 6. Core body 4 is formed by stacking first and second thin disc-shaped iron plates 8 and 10, as depicted in FIGS. 5a and 5b respectively. Each of first disc-shaped plate 8 has four cutout portions 12 on the circumferential areas, and both first and second disc-shaped plates 8 and 10 have one center cutout portions 14 and 16, respectively. Cutout portions 12, 14 and 16 are obtained by a conventional punching method. Core body 4 includes a stack of a plurality of first disc-shaped plates 8 and a stack of a plurality of second disc-shaped plates 10. The radially outward edge of plates 8 define an exterior cylindrical surface 24. In the first embodiment, the diameter of the second disc-shaped plates 10 is smaller than the diameter of the first disc-shaped plates 8. As a result, core body 4 extends in the axial direction beyond the end of surface 24.

Figure 6:
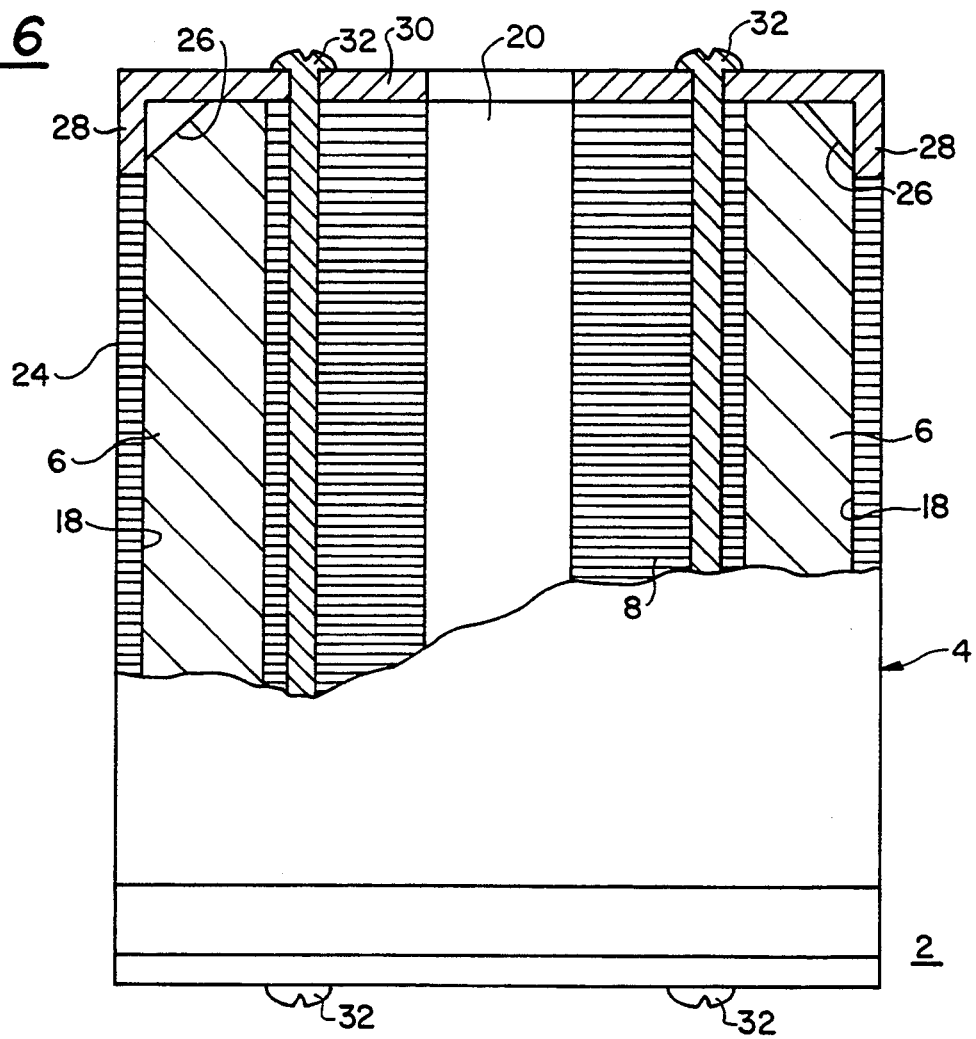
FIG. 6 is a modification of the first embodiment.

When first disc-shaped plates 8 are stacked, the four cutout portions 12 of each disc align together so as to form holes 18 in the core body 4. Magnets 6 are inserted in holes 18. A center hole 20 for the insertion of a rotator shaft (not shown) is formed in the core body 4 by center cut out portions 14 and 16 when first and second disc-shaped plates 8 and 10 are stacked. Permanent magnets 6 with different poles are then alternately inserted in holes 18. As shown in FIG. 5b, second disc-shaped plate 10 is provided with tongues 21, each of which is placed between two adjacent magnets 6 so that second stacked disc-shaped plates 10 are firmly fixed. When first disc-shaped plates 8 are staked, their thin width portions 5 form the cylindrical surface 24 of the core body 4, cylindrical surface 24 is then faced to windings of a stator (not shown) of the electric motor. A cutaway portion 26 is provided at a one end of each permanent magnet 6 so that a smooth insertion of the magnets 6 into hole 18 of the core body is realized. As shown in FIG. 4, each of the magnets' cutaway portions 26 projects beyond the axial end of holes 18 since the exterior surface 24 does not extend in the axial direction as far as the core body 4. To cover these exposed portions of the magnets, a ring body 28 is set upon the outmost side of the endmost disc-shaped plates 8, where the outer ring surface 29 of ring body 28 conforms with the cylindrical surface 24 of the core body. A pair of thin lid plates 30 are then attached to ring body 28 for fixing first and second disc-shaped stacked plates 8 and 10 with rivets 32. As shown in FIG. 6, ring body 28 may be integrally formed with lid plate 30. Numerals 34 and 36 denote cutout portions for making insertion holes 38 for rivets 32.

According to the first embodiment of the present invention, cutaway portions 26 of magnets 6 are covered by the ring body 28 so that no displacement or movement of the disc-shaped plates 8 or 10 occurs when the shaping of cylindrical surface 24 of core body 4 is carried out by cutting. This allows for the fast shaping of core body 4 as well as dimensional accuracy of rotator element 2.

Figure 7:
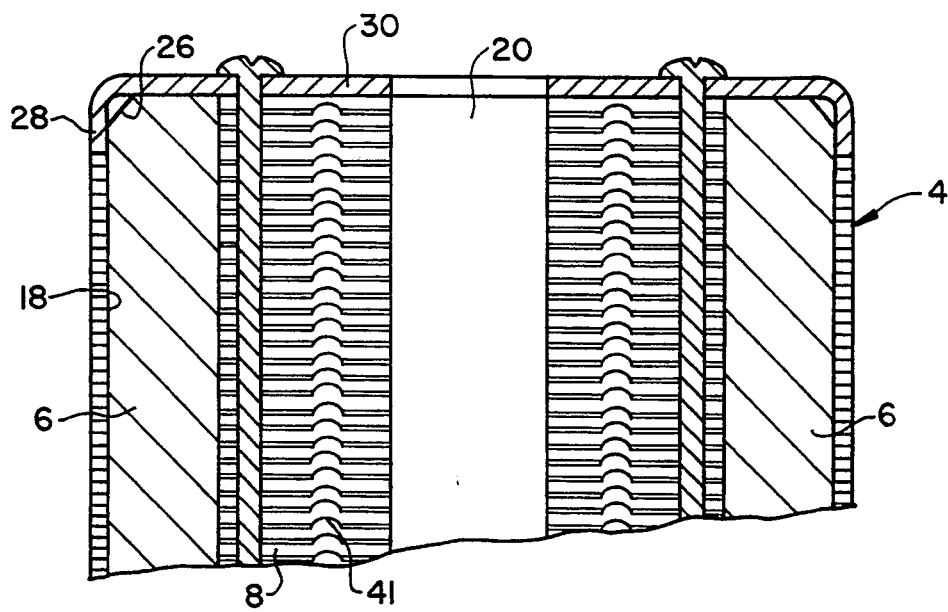
FIG. 7 is a partial cross sectional view of a second embodiment of a rotator element for an electric motor of the present invention.
Figure 8:
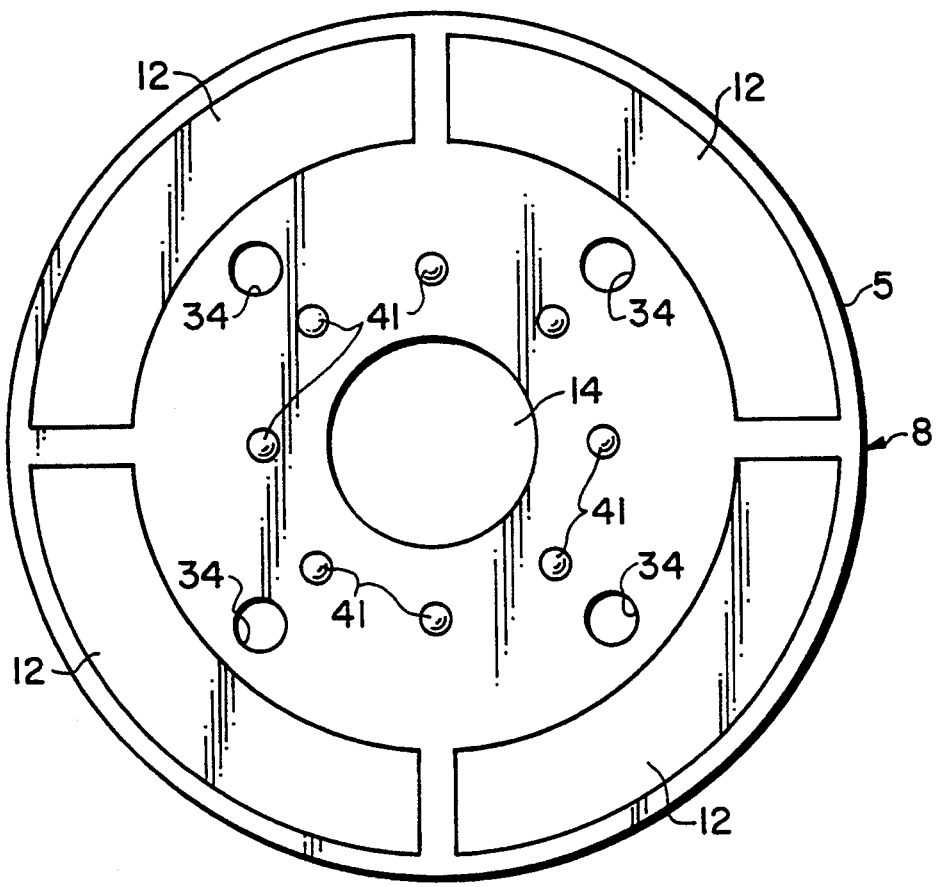
FIG. 8 is a front view of disc-shaped plates of the rotator element shown in FIG. 7.
Figure 9:
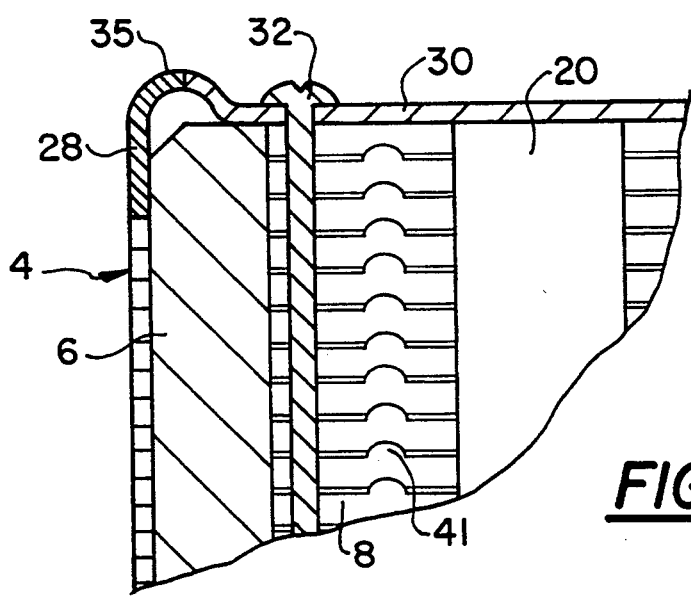
FIG. 9 is a modification of the second embodiment.

Other embodiments of the present invention are explained hereunder wherein like reference characters designate identical or corresponding elements of the above described first embodiment. A second embodiment is shown in FIG. 7. Similar to the first embodiment, a core body 4 is formed by stacking disc-shaped plates 8. Each of the plates 8 has a center cut-out portion 14 which align with each other when the plates are stacked, thereby forming the center hole 20 of the core body for insertion of a rotator shaft (not shown). Additionally, when the disc-shaped plates 8 are stacked, four cutout portions 12 of each disc align together so as to form holes 18 in the core body 4. Permanent magnets 6 with different poles are then alternately inserted in holes 18. Further provided in each of the plates 8 are cutout portions 34 for making insertion holes 38 when the plates are stacked. Rivets 32 are then inserted into the insertion holes 38 for fixing the stacked plates 8. However, in this embodiment, second stacked disc-shaped plates 10 are eliminated from the cylindrical core body 4. Instead, each of disc-shaped plates 8 is provided with protrusions 41 projecting out from the surfaces around the center cutout portion 14. Having provided protrusions 41 on each disc-shaped plate 8, a clearance is developed between each two adjacent disc-shaped plates 8 when staked. Before ring body 28 is placed on the outermost side of the endmost disc-shaped plates 8, a pressure must first be applied to the peripheral edge portions of disc plates 8. This compresses the peripheral edge portions of the disc plates together so as to eliminate the clearance between the peripheral edge portions of plates 8 to make adjacent peripheral edge portions contiguous. This offsets the peripheral edge portion of the end most plate 8 from the remainder of the end most plate 8. Ring body 28, which is integrally formed with lid plate 30, is then placed on the peripheral edge portion of the endmost disc-shaped plate 8 so as to enclose the magnet's cut away portion 26. As shown in FIG. 9, an outwardly extending resilient member 35 connecting the ring body 28 and lid plate 32 may be employeed.

Figure 10:
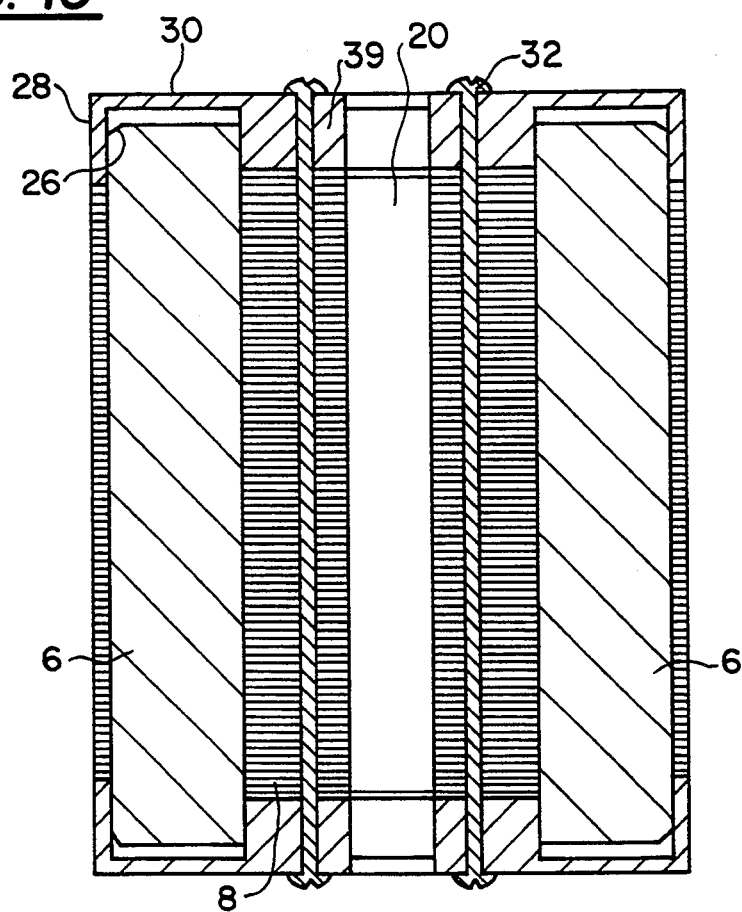
FIG. 10 is a partial cross sectional view of a third embodiment of a rotator element for an electric motor of the present invention.
Figure 11:
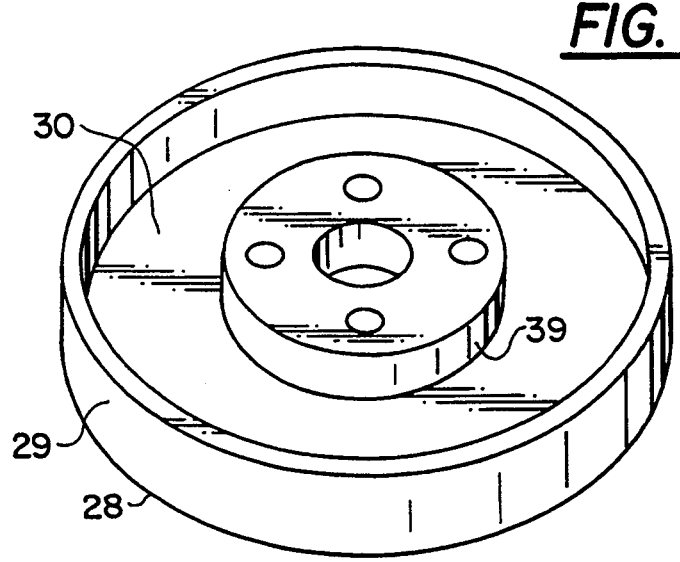
FIG. 11 is a perspective view of a ring body integrally formed with a lid plate having a projection of the rotator element shown in FIG. 12.
Figure 12:
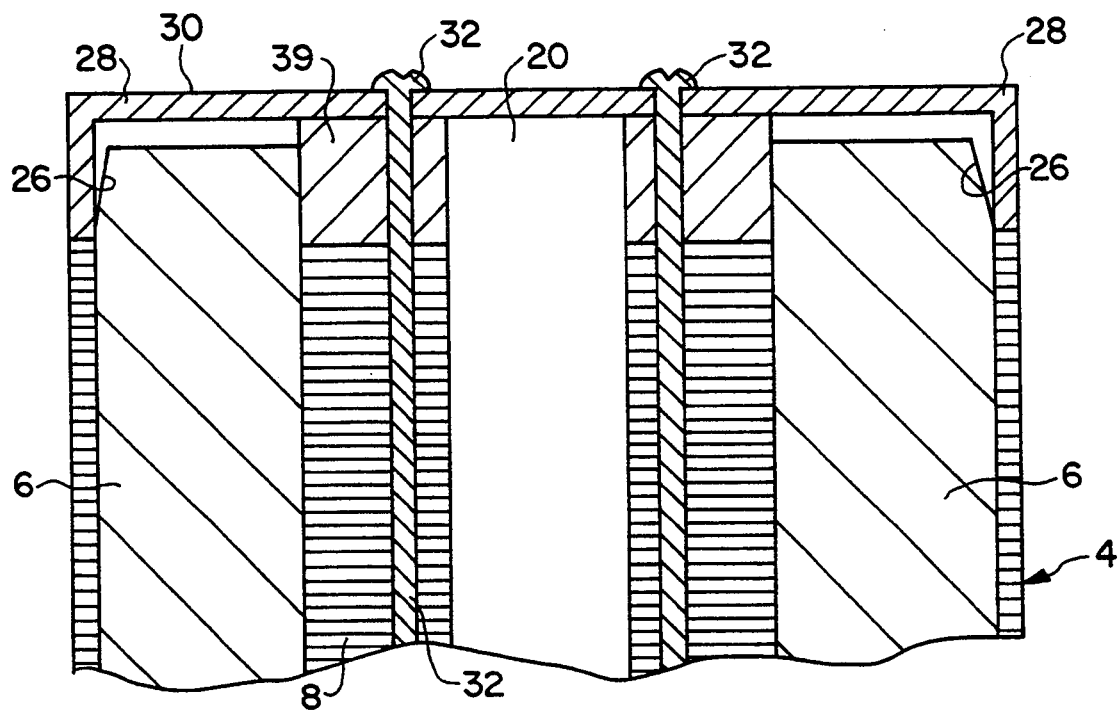
FIG. 12 is a modification of the third embodiment.

A third embodiment, which is regarded as a modification of the first embodiment, is shown in FIGS. 10 to 12. A cylindrical solid body 39 is used as a replacement for the second stacked disc plates 10 used in the first embodiment. As shown in FIG. 11, cylindrical body 36 is integrally formed with ring body 28 and lid plate 30. As shown in FIG. 12, cylindrical body 39 may be separately prepared with magnetic materials while ring body 28 and lid plate 30 are integrally formed.

The present invention has been described with respect to specific embodiments. However, other embodiments based on the principles of the present invention should be obvious to those of ordinally skill in the art. Such embodiments are intended to cover by claims.

What is claimed is:

1. A rotator element of an electric motor comprising:
   a cylindrical core body including a stack of disc-shaped plates, each of said plates having a plurality of cutout portions arranged on a circumferential area thereof so as to provided a plurality of holes along a rotational axis of said core body when said plates are stacked;
   a plurality of permanent magnets placed in said holes so as to be fixed within said core body, each of said magnets having a cutaway portion provided on at least one end thereof, wherein each said cutaway portion projects axially outward from an axial end of one of said holes; and
   a ring placed on at least one end of said core body so as to enclose each said cutaway portion of said magnets, wherein an outer circumferential surface of said ring lies substantially flush to a circumferential surface of said core body.

2. A rotator element for an electric motor according to claim 1, further comprising a lid plate placed over said ring and the endmost plate of said stacked disc-shaped plates.

3. A rotator element for an electric motor according to claim 2, wherein said ring and said lid plate are integrally formed.

4. A rotator element for an electric motor comprising:
   a cylindrical core body including a stack of disc-shaped plates, each of said disc-shaped plates having a plurality of cutout portions arranged on a circumferential area thereof, wherein a plurality of holes along a rotational axis of said core body are provided when said disc-shaped plates are stacked, each of said disc shaped plates including a plurality of protrusions provided thereon;
   a plurality of permanent magnets placed in said holes so as to be fixed within said core body, each of said magnets having a cutaway portion provided on a least one end thereof, wherein each said cutaway portion projects axially outward from an axial end of one of said holes; and
   a ring placed on at least one end of said core body so as to enclose each said cutaway portion of said magnets, wherein an outer circumferential surface of said ring lies substantially flush to a circumferential surface of said core body.

5. A rotator element for an electric motor according to claim 4 further comprising a lid plate placed over said ring and an endmost plate of said stacked disc-shaped plates.

6. A rotator element for an electric motor according to claim 5, wherein said ring and said endmost plate are integrally formed.

7. A rotator element for an electric motor according to claim 4, wherein said protrusions separate adjacent ones of said disc-shaped plates, with peripheral edge portions of adjacent ones of said disc-shaped plates being contiguous.

* * * * *